US008230346B2

(12) United States Patent
Ishida et al.

(10) Patent No.: US 8,230,346 B2
(45) Date of Patent: *Jul. 24, 2012

(54) GRAPHICAL USER INTERFACE FOR AN INFORMATION MEDIATION SYSTEM

(75) Inventors: Takayuki Ishida, Kanagawa (JP);
Yoshiharu Dewa, Tokyo (JP); Megumi Nozu, Chiba (JP); Hiroki Kato, Kanagawa (JP); Hirotoshi Maegawa, Tokyo (JP)

(73) Assignee: Sony Corporation, Tokyo (JP)

( * ) Notice: Subject to any disclaimer, the term of this patent is extended or adjusted under 35 U.S.C. 154(b) by 907 days.

This patent is subject to a terminal disclaimer.

(21) Appl. No.: 11/892,134

(22) Filed: Aug. 20, 2007

(65) Prior Publication Data

US 2008/0092072 A1 Apr. 17, 2008

Related U.S. Application Data

(63) Continuation of application No. 10/352,840, filed on Jan. 27, 2003.

(30) Foreign Application Priority Data

Jan. 28, 2002 (JP) ................................. 2002-018890

(51) Int. Cl.
*G06F 3/00* (2006.01)
(52) U.S. Cl. ........ 715/738; 707/708; 707/728; 707/737; 707/771; 707/777; 715/848; 715/838
(58) Field of Classification Search .................. 715/738, 715/838, 848; 707/708, 723–728, 737, 738, 707/771, 777
See application file for complete search history.

(56) References Cited

U.S. PATENT DOCUMENTS

| 5,649,193 A | | 7/1997 | Sumita et al. | |
| 5,918,236 A | * | 6/1999 | Wical | 715/209 |
| 5,963,965 A | * | 10/1999 | Vogel | 715/236 |

(Continued)

FOREIGN PATENT DOCUMENTS

EP 1 103 901 B1 11/2003

(Continued)

OTHER PUBLICATIONS

Atsushi Hiroike et al., "Visualization of Pictorial Feature Space by Using Virtual Reality," *Technical Report of Institute of Electronics, Information and Communication Engineers* ("*IEICE*"):PRMU 98-86 (Sep. 1998).

(Continued)

*Primary Examiner* — Ba Huynh
(74) *Attorney, Agent, or Firm* — Finnegan, Henderson, Farabow, Garrett & Dunner, L.L.P.

(57) ABSTRACT

A graphical user interface for an information mediation system is provided for assisting the user to discover an information source that matches a sense of value of the user which normally can not be explicitly expressed in language, from a plurality of information sources such as bulletin board sites. The information mediation apparatus collects information from the plurality of information sources, analyzes the information, and generates one or more guideposts corresponding to information values thereof and data indicating a correlation between the plurality of information sources relative to the guideposts. A client apparatus receives one or more guideposts and a set of data containing information indicating the correlation of the information sources relative to the guidepost from the information mediation apparatus, and displays the correlation between these information sources in such a mode that the user can easily understand.

18 Claims, 15 Drawing Sheets

U.S. PATENT DOCUMENTS

| | | | |
|---|---|---|---|
| 6,029,195 A * | 2/2000 | Herz | 725/116 |
| 6,038,560 A * | 3/2000 | Wical | 1/1 |
| 6,240,410 B1 * | 5/2001 | Wical | 1/1 |
| 6,317,739 B1 * | 11/2001 | Hirata et al. | 1/1 |
| 6,363,378 B1 * | 3/2002 | Conklin et al. | 1/1 |
| 6,414,691 B1 | 7/2002 | Nakagawa et al. | |
| 6,460,034 B1 * | 10/2002 | Wical | 1/1 |
| 6,523,026 B1 * | 2/2003 | Gillis | 1/1 |
| 6,766,316 B2 * | 7/2004 | Caudill et al. | 1/1 |
| 6,978,264 B2 * | 12/2005 | Chandrasekar et al. | 1/1 |
| 6,988,248 B1 * | 1/2006 | Tang et al. | 715/839 |
| 7,036,085 B2 * | 4/2006 | Barros | 715/764 |
| 7,043,094 B2 * | 5/2006 | Thomas et al. | 382/305 |
| 7,076,736 B2 * | 7/2006 | Hugh | 715/743 |
| 7,296,009 B1 * | 11/2007 | Jiang et al. | 1/1 |
| 2002/0075331 A1 | 6/2002 | Orbanes et al. | |
| 2002/0129015 A1* | 9/2002 | Caudill et al. | 707/6 |
| 2004/0030741 A1* | 2/2004 | Wolton et al. | 709/202 |
| 2004/0119759 A1* | 6/2004 | Barros | 345/853 |

FOREIGN PATENT DOCUMENTS

| | | |
|---|---|---|
| JP | 01-189721 | 7/1989 |
| JP | 7-192020 | 7/1995 |
| JP | 1995-192020 | 7/1995 |
| JP | 9-288556 | 11/1997 |
| JP | 1997-288556 | 11/1997 |
| JP | 2000-076279 | 3/2000 |
| JP | 2001-005822 | 1/2001 |
| JP | 2001-143092 | 5/2001 |
| JP | 2001-155063 | 6/2001 |
| JP | 2001-357066 | 12/2001 |
| JP | 2002-018890 | 1/2002 |

OTHER PUBLICATIONS

Hidekazu Shiozawa, "WWW Visualization Supporting Flexible Information Selection with the Cutting Operation," *IPSJ SIG Notes* Vol., No. 43, pp. 61-66 (May 16, 1997).

Yoshinori Musha et al., "A User Interface Visualizing Feature Space for Content-Based Image Retrieval," *Technical Report of IEICE*, IE98-49, PRMU 98-72, MVE 98-72, pp. 141-148 (Jul. 1998).

* cited by examiner

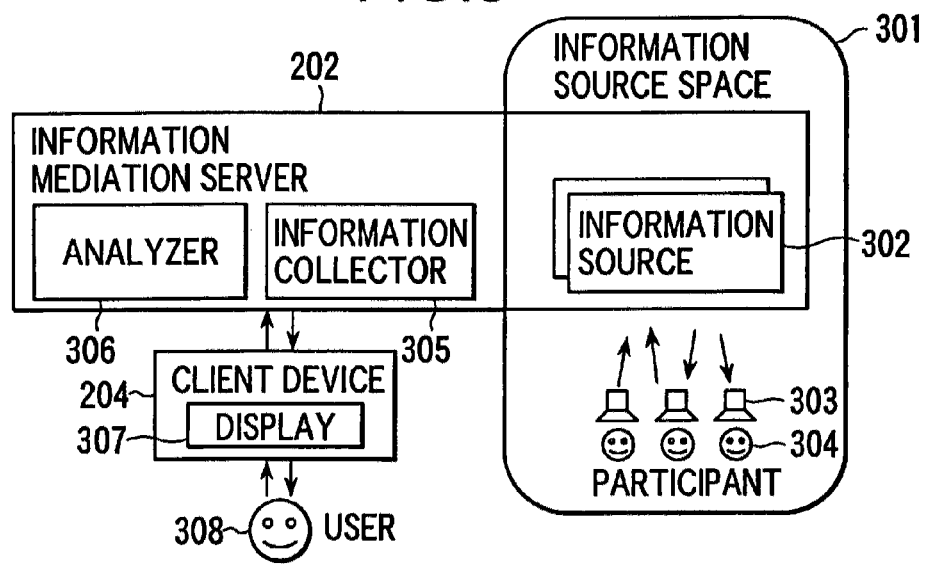
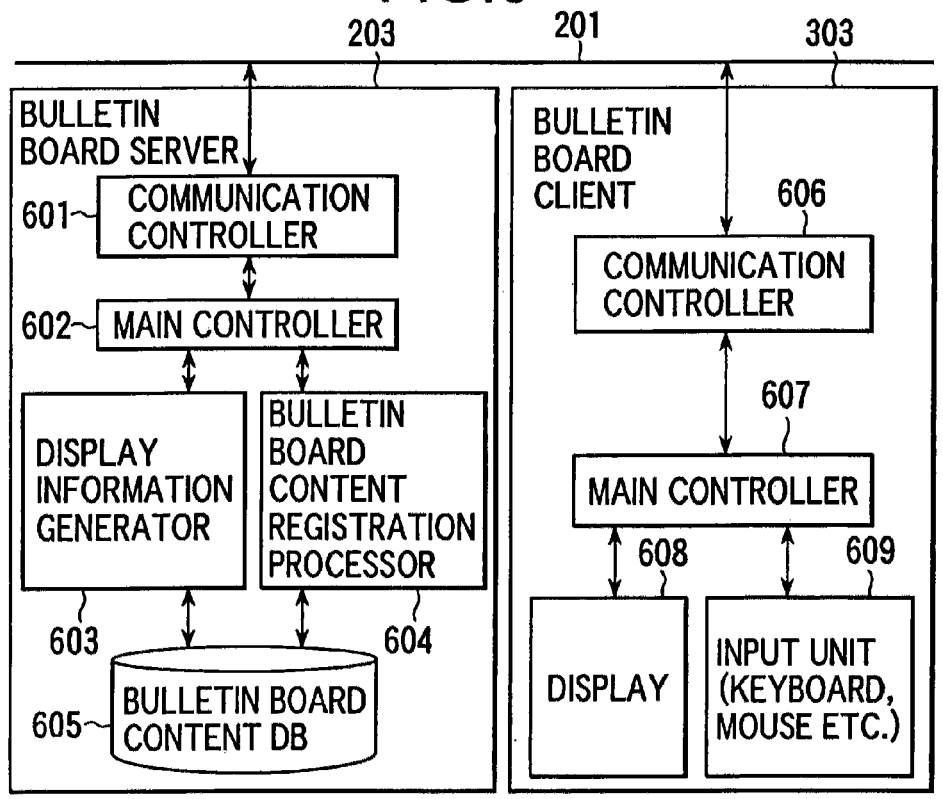

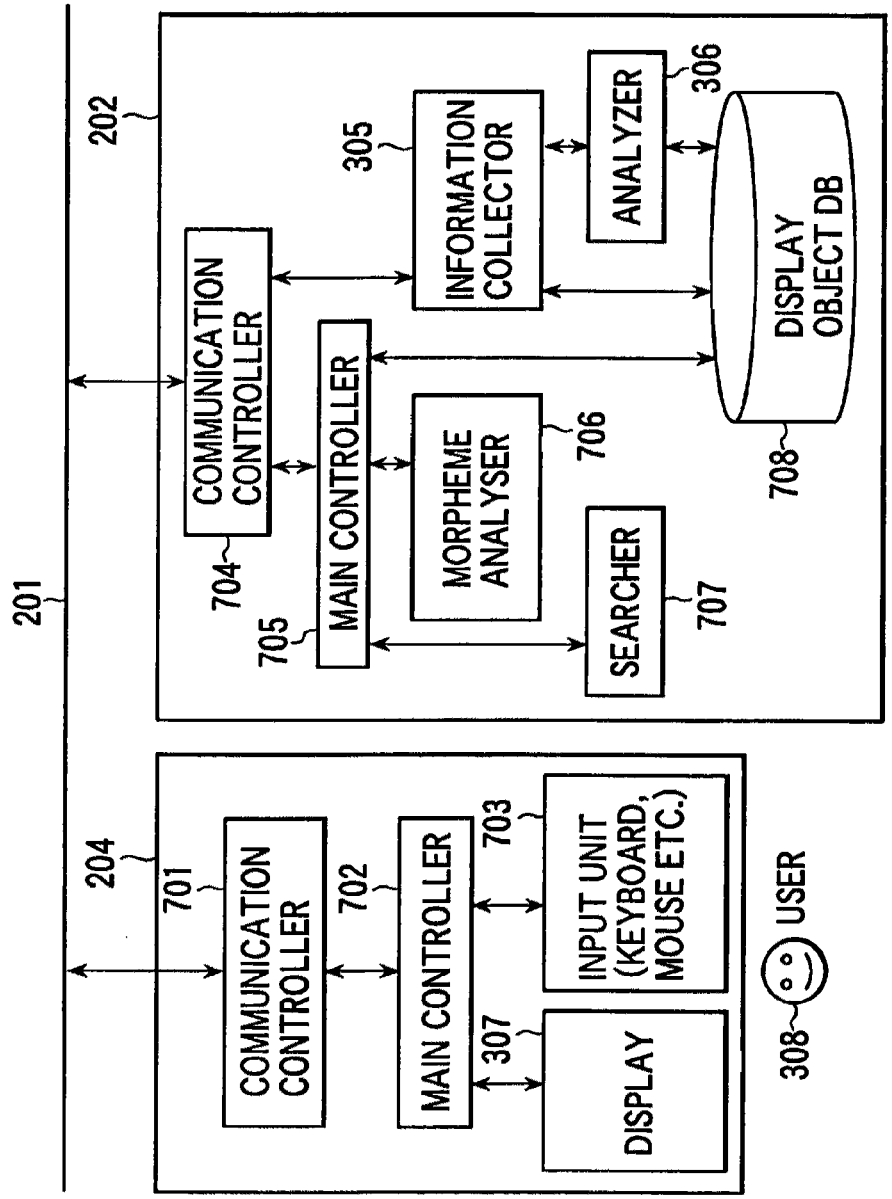

FIG.8

| BOARD | | | | |
|---|---|---|---|---|
| DATA CONTENTS | FIELD NAME | DATATYPE | PK | REFERENCE |
| BOARD IDENTIFIER | id | int8 | ○ | |
| BOARD URL | url | text | | |
| BOARD NAME | title | text | | |
| BOARD START DATE | startdate | timestamp | | |
| LAST UPDATE DATE | enddate | timestamp | | |
| NUMBER OF OPINIONS | opinions | int8 | | |
| TEXT SENT AT THE START | sent | text | | |
| ACTIVITY, 5 STAGES(1,2,3,4,5) | activity | int | | |
| FRESHNESS, 3 STAGES(1,2,3,) | freshness | int | | |
| PORTAL NAME | portal_name | text | | |
| TOP CATEGORY NAME | top | text | | |
| SUBCATEGORY STRING | category | text | | |
| X COORDINATES | xloc | float | | |
| Y COORDINATES | yloc | float | | |
| Z COORDINATES | zloc | float | | |

GRAPHICAL USER INTERFACE FOR AN INFORMATION MEDIATION SYSTEM

CROSS REFERENCE TO RELATED APPLICATIONS

This application is a continuation of U.S. application Ser. No. 10/352,840, filed Jan. 27, 2003, the contents of which are incorporated herein by reference. U.S. application Ser. No. 10/352,840 claims priority to Japanese Patent Application No. JP 2002-018890, filed Jan. 28, 2002.

BACKGROUND OF THE INVENTION

1. Field of the Invention

The present invention relates to a graphical user interface (GUI) for an information mediation system.

2. Description of Related Art

In accordance with a recent development of communication technologies and its pervasion into the society, information sources available on WWW (World Wide Web, hereinafter referred to as "Internet") are increasing. As examples of such information sources, there are emerging, for example, a multimember participating intelligent active body (a site where a plurality of persons exchange information and opinions via internet, which includes, for example, an electronic bulletin board system (BBS) and a network community (hereinafter referred to as a community) such as a chat net system provided on the internet) and other sites handling various contents such as picture images, paintings, music and so on. With an increasing number of these information sources, it is becoming more difficult for a user to search and find an information source which corresponds to his/her own sense of value from an enormous number of information sources. Consequently, there is an increasing need for a development of a mechanism of presentation whereby the user can efficiently select an appropriate information source the user wants and participate therein.

As an example of conventional mechanisms of presentation for allowing the user efficiently to select an information source, there is a categorized classification display method.

In this method, various information sources are classified into several categories in advance, for example, into "art and humanity", "business and economy", "computer and internet" and respective names of categories are labeled for reference. When the user selects one from a plurality of names of categories, information sources belonging to this selected category are presented. Further, in most cases, it is general that the category classification is given in a hierarchical system. The hierarchical category classification system has such a repetitive structure that one category includes sub categories, and a respective sub category includes sub-sub categories, and so on. For example, the following repetitive structure may exist, "entertainment>movie, video>soundtrack> . . . "

Further, as another example of conventional technologies for presenting information sources to the user, there is a method of presenting a list/table of information sources extracted on the basis of keywords. In the keyword search method, a database in which information sources and keywords extracted corresponding to the contents thereof are registered is provided in advance, and when the user inputs a keyword of interest, any information source corresponding to the keyword is presented. In this instance, generally, these keywords use a word as it appears in the contents of the information source. For example, "hobby", "fishing" and the like keywords are used. Further, as the method of display in the case of presentation of the table or list, it will list in the order of freshness of information or in a descending order of the number of hits or coincidence of search.

The conventional methods of presentation of information sources described above, however, have the following problems.

1. The Categorized Classification Presentation Method

First of all, it is not always possible that the above-mentioned categorized classification presentation method can efficiently provide a systematic classification of information sources the user actually desires. It is because that a respective information source has a different "information value" depending on various reasons such as a purpose of its foundation, idiosyncrasy of its producer, personality of the operator, propensity of participants, types and contents of information to be treated in its information source, the number of participants (many or few), activity, discussions, submission of inquiries and solutions, expression of opinions, seeking friends, sharing of emotions, and so on. The "information value" refers to evaluation information given to an information source or to individual pieces of information contained in the information source, and, in particular, it relates to evaluation information which more significantly and saliently indicates characteristics that an individual information source has over a whole entity of the information sources of interest.

On the other hand, each user seeks a different information value depending on one•sown sense of values. For example, a user who is fond of a logical thinking will prefer logical topics generally, and a user who weighs feelings will prefer sensitive topics.

In consideration of satisfaction of the user, it is desirable to provide a method of presentation of information sources so that the user can select in accordance with his/her own sense of values. However, the typical conventional categorized classification presentation does not necessarily agree with a classification presentation based on the information value. Further, it is generally difficult objectively to determine an information value on an information source described above and label a category title thereon. Therefore, since the methods of presentation of information described above cannot present information sources, the user can not efficiently select a correct information source the user actually wanted to access.

2. Keyword Search Method

On the other hand, even in the keyword search method, a result of presentation of information obtained is not always in conformance with the sense of values the user actually wanted to access. It is because that a user-designated keyword, for example, "logical" may not be contained in an information source that has actually an information value desired, thereby, it often occurs to fail to hit and output the information source having the "information value" the user wanted to access even if searched using such keyword. Further, as compared with an ordinary case of searching information on a specific topic by inputting a keyword, it is generally difficult to explicitly express an "information value" corresponding to one's own sense of value into language of keywords, except for a user who always performs a self-analysis of that sort. Still further, because the order of presentation of the information sources extracted and listed by searching does not always coincide with the order of preference in the sense of values of the user, the user will have to browse the contents of the whole information sources extracted, which, however, will be impossible in practice as the number of the information sources extracted becomes enormous.

Thereby, according to the methods of presentation of information described above, it is difficult to present information for the user to be able to efficiently select an object information source the user really wants to access.

SUMMARY OF THE INVENTION

Contents and objects dealt with in the information sources available on the internet are multifaceted, and their information values are diversified and various. Even limiting to information sources of a user participating site, they extend very widely, and include a problem solution, information exchange, opinion presentation, seeking friends, sharing emotions, contents exchange, artwork presentation and so on. Further, as to a way of expressing contents, although limited to such information sources that can be expressed in characters, they are diversified to include from a logical sentence to a symbolic character string expressing emotions. A diversity of contents, objects, expressions and methods of expressions to be communicated with the information sources on the internet will be perceived as the characteristics and attributes thereof that have been developed and shaped by themselves as axes of the sense of values and the system of thought belonging to respective information sources, while reflecting thereon various kinds of the sense of values of the participants involved in these information sources, which hereinafter will be referred to as a "communication value". This communication value is an example of the information values.

FIG. 1 is a conceptual diagram describing the information value. The sense of values unique to a respective user based on a system of thought and a desire of expression of the user will be referred to as a "user's sense of value". An example of such user's sense of value may include a "sense of values that places importance on logical discussion" or a "sense of values that places importance on sharing emotional atmosphere using rich emotional expressions more than sticking to a logical conclusion". It should be noted that the user himself/herself is not always capable of expressing these senses of values explicitly in words.

In FIG. 1, a first layer Li represents an inner mental space of the user, a second layer L2 represents an information value space, and a third layer L3 represents a space including plural information sources. The information source may be such one that handles text information or one that handles non-language information such as picture image data or the like. Further, it may be such one that is generated by a plurality of participants like a bulletin board site, or one that is originated by one producer.

In a mental inner space 101, a user 100 may have one or more aspects of sense of values 102 (hereinafter referred to as the "user's sense of values"). For example, while in office the user may have a sense of values placing emphasis on a logical point, the same user may prefer to place on a sense of values of soothing feelings at home.

The second layer L2 represents an information value space 103 which is a system comprising information values 104. By way of example, for derivation of the information value space, the analysis method disclosed in the "Method and Device for Analyzing Thought System", Japan Patent Publication No. 2001-155063 may be used.

A plurality of information values 104 exist in the information value space 103, and it is supposed that the user's sense of values 102 described above corresponds to either one of the plurality of information values 104, and the user 100 feels satisfaction to a specific information source having the information value 104 corresponding to his/her own user's sense of values 102. However, it is seldom a case that the user recognizes explicitly what the actual user's own sense of values is, and it is difficult for the user to know such an aspect of the user's sense of values that may be contained in the deep psyche. Thereby, it is very difficult to discover by himself/herself an adequate information value 104 that corresponds to the user's own sense of value 102.

The third layer L3 represents a space 105 comprising information sources available on the internet, and includes a plurality of information sources 106. Each of the plurality of information sources 106 contains one or more pieces of information 107. The information source 106 may be such one that changes its contents from time to time with addition of new information and deletion of obsolete information, or one that does not change its contents. Further, the one or more pieces of information 107 contained in the information source 106 may be information provided from a plurality of unspecified participants, information provided from specified one or more participants, or any other information provided by any other manners.

Any information value 104 corresponding to any information source 106 is one of important elements that determines characteristics and/or attributes of its information source. It is because that the information value 104 reflects and signifies a context of the information and/or direction of thinking belonging to the information source 106, and via the assist of the information value 104, new participants increase and its intellectual activity further develops.

However, the conventional technologies have a problem that the signification of information source 106 based on the information value 104 has been difficult to realize.

The present invention is contemplated to signify and display the plurality of information sources 106 existing on the internet using its information value 104 belonging to a respective information source. For example, as to a regularity of display according to a similarity, by use of the example of the method of analysis disclosed in the "Method and Device for Analyzing Thought System" in the Japan Patent Publication No. 2001-155063 described above, respective objects signifying respective information sources 106 having information values 104 of similar propensities are disposed in proximity, or aligned on a same line.

Further, in derivation of the similarity among plural information sources 106 regarding the information value 104, it does not need any additional step of evaluation or the like by the participants of the community or by a person in charge of classification in the searching sites (for example, a tabulation of questionnaires such as "Does this community place emphasis on a logical conclusion?" or the like), and, advantageously, it uses primary information belonging to the information source 106 as an element of analysis for the information value 104. The "primary information" refers to any information provided to the information source for achievement of the purpose of the information source 106, and includes, for example, contributions/opinions to the bulletin board sites, picture images at the museum sites, files of musical compositions at the musical sites, and so on.

In order to solve or alleviate the above-mentioned problems associated with the conventional technologies, a system according to the present invention has the following characteristics and advantages.

A graphical user interface according to an aspect of the invention is for presenting a plurality of information sources to the user, and is characterized by displaying information source display objects, each signifying each information source, disposed in an information value space on the basis of a correlation between the plurality of information sources obtained as a result of analysis.

An outer appearance of a respective information source display object is determined in accordance with an attribute and/or characteristic of a respective information resource corresponding thereto. As an example of the attribute or characteristic of the information source, an activity of the information source may be considered. Its activity may be determined by an increase of information in the information source during a predetermined period of time (e.g., the number of opinions presented to a bulletin board community). Alternatively, the activity may be determined by an interval between additions of information within a predetermined period of time (e.g., an interval between submissions of opinions).

As the attribute or characteristic of the information source, also there may be considered a yardstick of freshness of the information source. The "freshness" may be determined by a period of time elapsed since the generation of the information source or by the last date of addition of information.

The "activity" described above may be indicated by a rotation speed of the information source display object, and the "freshness" described above may be indicated by a shape of the information source display object, or vice versa.

A graphical user interface system for presenting a plurality of information sources to the user according to another aspect of the invention is comprised of a. first display region for displaying a whole information value space including the information source display objects being disposed on the basis of a correlation obtained by the analysis thereof between the plurality of information sources; and a second display region for displaying a specific region among the information value space, which is contained in a virtual field of vision of the user.

By provision of both the first display region and the second display region, the system has a function to be able to display the information value space including the plurality of information source display objects to the user so as to be able to observe from a macroscopic viewpoint and a microscopic viewpoint.

The first display region has a function to indicate to the user a present position of viewpoint in the information value space corresponding to an overall thought system.

The second display region enables for the user to scrutinize the information value space by shifting the viewpoint, zooming in and the like.

A system according to still another aspect of the invention is characterized by further comprising a third display region for displaying a most update state of the information source display object by recording and maintaining the same. By recording the information source display object from time to time so as to be able to confirm singularly, it becomes possible to continuously observe a change in any information source of interest signified thereby and corresponding thereto.

A system according to further another aspect of the invention is characterized by further comprising a fourth display region for recording a field of vision designated by the user and displaying contents of the information value space perceived at the designated field of vision in response to a request from the user, in the first display region described above. The provision of the fourth region facilitates observations of such changes in a specific area within the information value space through a fixed point observation, as emergence of a new information source, extinction of a specific information source, relative positional changes of information sources (in its information value or communication value), and the like.

According to the present invention, various information sources available on the internet can be displayed as signified and disposed in accordance with its information value, thereby enabling for the user to perform a heuristic search, providing a means for efficiently searching through information sources, scrutinizing and participating in the activity in the information sources. Even if the user feels it is not easy to express his/her own sense of value explicitly, according to the present invention, advantageously, a plurality of information sources having equivalent or similar information values are disposed juxtaposed to one another. Therefore, by marking a typical guidepost leading to a desired information value or actually browsing contents of an information source or the like, if the user can find at least one information source or a guidepost that matches his/her own sense of value, an efficient search can be attained because it can be expected with a high certainty that other information sources disposed in the vicinity thereof are likely to have an equivalent or similar sense of value.

Further, by provision of a guide data (such as a tube) suggesting a similarity in the information values for those objects existing within the tube, the user can easily recognize a tendency in the information sources.

Still further, because only the primary information in the information source is used for analysis of information values, the analysis can be executed without a need of addition of evaluation by the participants or the operator of the information sources.

Still more, by selecting an information source display object on display simply by clicking with a mouse or the like, the content of the information source corresponding thereto is displayed, thereby enabling for the user to select an appropriate information source more conveniently and easily to participate therein.

Furthermore, by periodically acquiring the content of activity from the information source, the system is enabled always to display to the user a most update status of the information value space.

According to the present invention, it is possible to present information to the user capable of linking between the user and the information source whereby the user can easily discover the information source having an information value matching the sense of value of the user.

Further, according to the present invention, even if the user cannot recognize his/her own sense of value explicitly, the user can readily discover an information source having the information value likely matching his/her sense of value.

Still further, according to the present invention, because that in the neighborhood of a specific information display object the user is interested in, there are likely to be disposed more information display objects having the similar information values, the user by visiting these information sources may discover uncultivated sense of value the user was not aware of (for example, such as in taste and fondness.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which:

FIG. 5 is a schematic diagram indicating still another exemplary configuration of the information mediation system of the embodiment of the present invention.

FIG. 6 is a block diagram indicating an exemplary configuration of a bulletin board server and a bulletin board client unit.

FIG. 7 is a block diagram indicating an exemplary configuration of an information mediation server and a client unit.

FIG. 8 shows an example of data structures of a display object database (DB).

DESCRIPTION OF THE PREFERRED EMBODIMENTS

By referring to the accompanying drawings, the information mediation system according to the embodiment of the invention will be described in detail in the following.

A First Preferred Embodiment

The first preferred embodiment of the present invention pertains to a system that treats electronic bulletin boards on the internet (hereinafter, referred to as the bulletin board) as its information source 106. Here, the "bulletin board" refers to a web site established by a plurality of participants who take part therein, and its primary information in the contents of its activity is supposed to be a piece of information added to this information source from the users of the bulletin board, for example, such as a natural sentence written into the bulletin board by its user.

An Exemplary System Configuration

Figure 1:
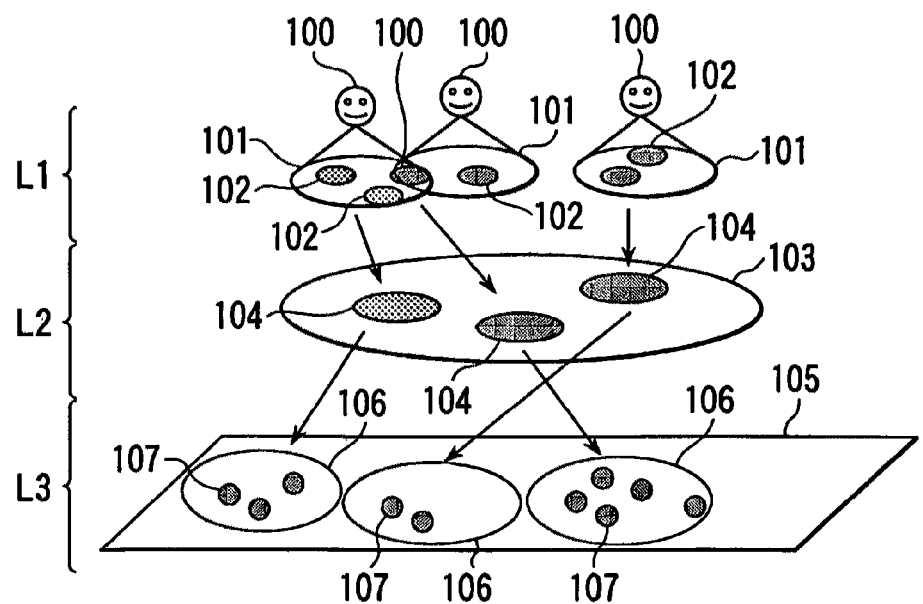
FIG. 1 is a conceptual diagram explaining the information value according to an embodiment of the present invention.
Figure 2:
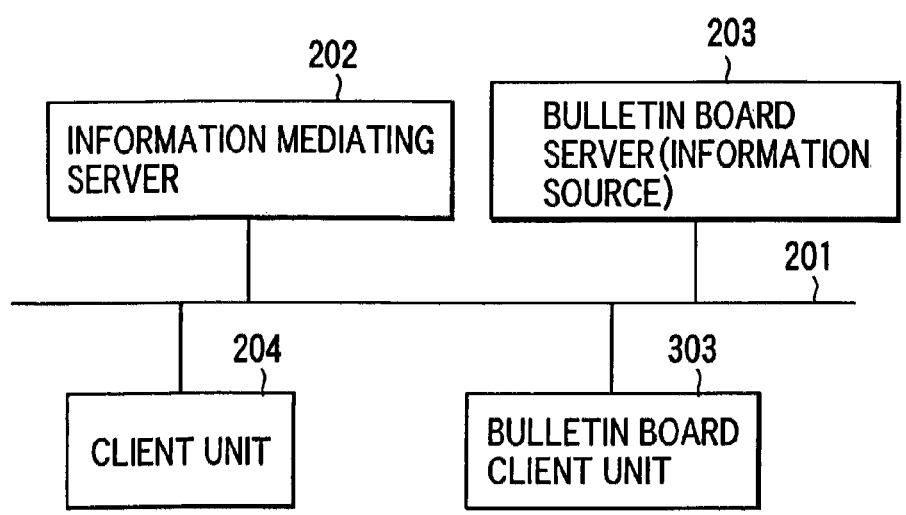
FIG. 2 is a block diagram depicting an exemplary configuration of an information mediation system linking between the user and a bulletin board.

FIG. 2 is schematic block diagram showing an exemplary system configuration of an information mediation system for linking the user thereof to a website bulletin board according to the embodiment of the invention.

By referring to FIG. 2, the information mediation system has an information mediation server 202 connected to a communication network 201, a bulletin board server 203 connected to the communication network 201, and a client device 204 connectable with the information mediation server 202 and the bulletin board server 203 via the communication network 201. By way of example, although only one bulletin board server 203 is depicted typically, however, it should be understood that a plurality of bulletin board servers 203 exist.

Communication Network 201

The communication network 201 functions to enable a plurality of apparatuses connected thereby to exchange information, without distinction of a wired, wireless, a dedicated line, or a switched line once a session is established therebetween. A respective communication network may be implemented by combining a plurality of networks via a gateway like the internet. Further, as to its connection, even if not directly connected to a base line, the so-called backbone, and temporarily connected by PPP (Point to Point Protocol) connection or the like, any type of connection will do provided that exchange of information is ensured when a session is established therebetween. By the way, the "communication network" described above should be understood also to include any communication network having dedicated lines fixedly wired and the like without switching equipment.

Information Mediation Server 202

The information mediation server 202 analyzes a correlation between a plurality of sites of bulletin boards supplied from a plurality of bulletin board servers 203 which are information sources 106 on the basis of contents of the sites of bulletin boards (for example, contributions to the bulletin boards), determines an index (guidepost) on the basis thereof, associates between the predetermined guidepost and the site of the bulletin board, and generates information to supply for displaying the predetermined guidepost and the site of the bulletin board on the client device.

The information mediation server 202 may be implemented using an information processing unit such as a computer, workstation or the like, having an arithmetic processor (CPU), a main memory (RAM), a read-only-memory (ROM), an input/output device (I/O), and an external storage such as a hard disk drive. A program for enabling the information processing unit to function as the information mediation server 202 or a program for enabling an information mediation method to be executed by the computer are stored in the RON or the hard disk drive described above. When these programs are loaded in the main memory to be executed by the computer, the information mediation server 202 is implemented, or the information mediation method is executed. Further, the above-mentioned programs are not necessarily required to be stored in the memory device within the system, and may be supplied from an external device (such as an application service provider (ASP) server) then to be loaded on the main memory.

Bulletin Board Server 203

The bulletin board server 203, which is a server unit for realizing one or more bulletin board sites, has a function to receive contributions/opinions from the client device 204 of a contributor, store the contents thereof, and enable the contents of contributions to be displayed at the client device in response to a request therefrom.

Client Device 204

The client device 204 has a function to receive information for enabling the predetermined index (guidepost/guide sign) and the bulletin board site to be displayed at the client device from the information mediation server 202, and to link the user and the bulletin board site by processing for display thereof. The client device 204, which is an information processing device such as a computer, workstation, mobile terminal or the like which can be connected to the information mediation server 202 via the communication network 201, includes, for example, a computer, a mobile communication terminal or a PDA (Personal Digital Assistant) having a Web link function, installed with a so-called browser which is a web document browsing software.

Bulletin Board Client Device 303

The bulletin board client device 303 has a function to allow for a client to read and contribute opinions to and from the bulletin board sites supplied from the bulletin board server 203. The bulletin board client device 303, which is an information processing device such as a computer, workstation, mobile terminal or the like which can be connected to the bulletin board server 203 via the communication network 201, includes, for example, a computer, a mobile communication terminal or a PDA (Personal Digital Assistant) having a web link function, installed with a so-called browser which is a web document browsing software.

By way of example, a single information processing unit may be allowed to function both as the client device 204 and the bulletin board client device 303.

Figure 3:
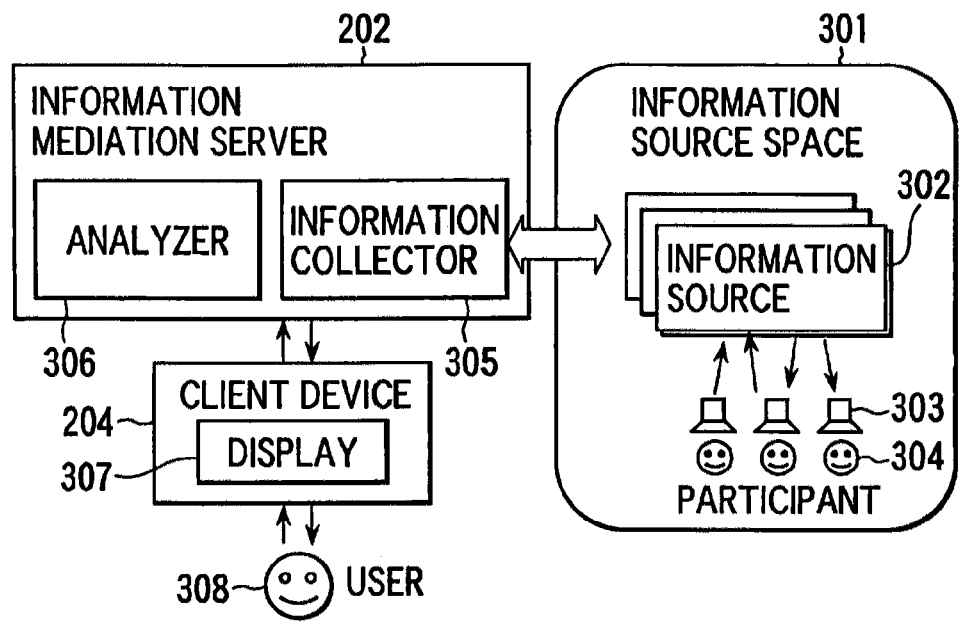
FIG. 3 is a schematic diagram indicating a relation between an information mediation server, client equipment and a community space including a plurality of bulletin boards.

FIG. 3 is a diagram showing a relation between the information mediation server 202, the client device 204 and an information source space 301 which contains a plurality of bulletin boards.

The information mediation server 202 has an information collector 305 which is a means for obtaining contents of the plurality of bulletin boards 302 contained in the information source space 301, and an analyzer 306 for analyzing an information value from the contents of information obtained by the information collector 305. Further, the client device 204 has a display 307 for displaying a result of analysis of the contents supplied from the information mediation server 202. The information source space 301 includes a plurality of bulletin boards 302, wherein each of the plurality of bulletin boards 302 receives and stores contributed opinions submitted from a bulletin board user 304 via a bulletin board client device 303, and simultaneously presents the contents of contributed opinions to the bulletin board user 304 via the bulletin board client device 303. By way of example, the bulletin board user 304 and the user 308 of the system of the present embodiment may be the same or different persons.

Figure 4:
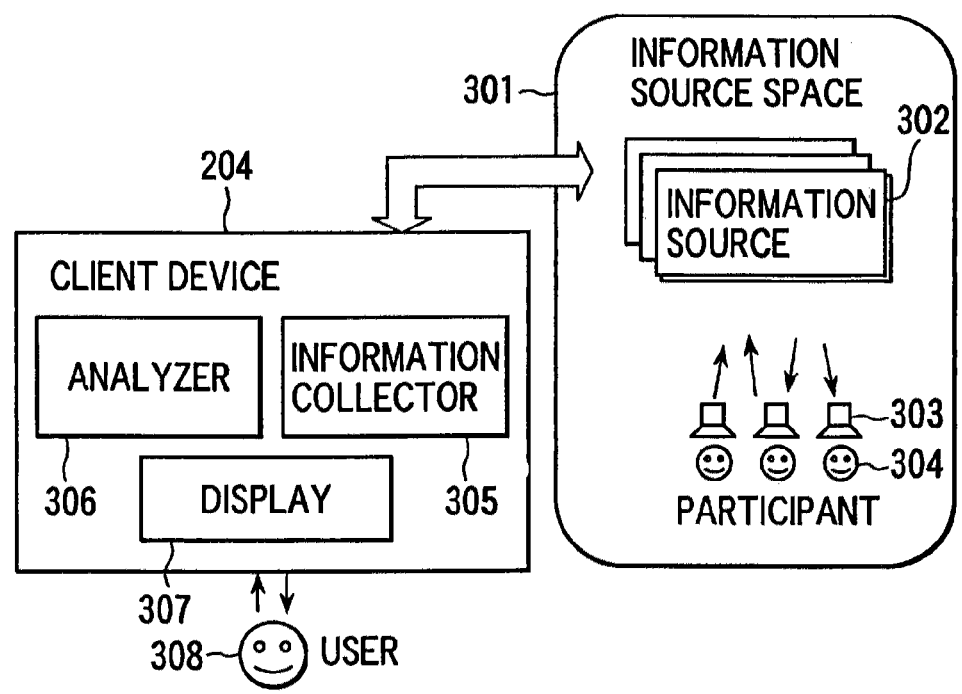
FIG. 4 is a schematic diagram indicating another exemplary configuration thereof, in which the information mediation server is not independently installed.

FIG. 4 is a diagram depicting another exemplary system configuration of the present embodiment, in which the information mediation server 202 is not provided independently as shown in FIG. 3. In this exemplary modification, the information collector 305 as the data acquisition means and the analyzer 306 are incorporated in the client device 204 to be operated by the user 308.

FIG. 5 is a diagram depicting still another exemplary system configuration according to the present embodiment. In this exemplary system configuration, such a case is shown, wherein the information processing unit functioning as the information mediation server 202 simultaneously functions also as the bulletin board server 203. The embodiment of the invention may have various other modifications in addition to the above-described system configuration.

In the following, the exemplary configuration of the information mediation server 202, the bulletin board server 203, the client device 204 and the bulletin board client device 303 illustrated in FIGS. 2 and 3 will be described further in detail.

Exemplary Configuration of the Bulletin Board Server and the Bulletin Board Client Device FIG. 6 is a block diagram depicting an exemplary configuration of the bulletin board server 203 and the bulletin board client device 303 of the present embodiment. The bulletin board server 203 has a communication controller 601, a main controller 602, a display information generator 603, a bulletin board content registration processor 604 and a bulletin board content database (DB) 605. The communication controller 601, which has a function to receive/send information to/from the communication network, is a front end communication processor comprising a protocol stack, a CPU for executing a predetermined communication procedure in compliance with the protocol stack, and the like. The main controller 602; which controls the communication controller 601, the display information generator 603, and the bulletin board content registration processor 604, has a function to receive contributions/opinions from the bulletin board client device 303 and supply data indicating the contents of the bulletin boards to the bulletin board client device 303. The display information generator 603 has a function to generate a data (e.g., HTML document data containing contribution contents) to be sent to the bulletin board client device 303, on the basis of the data read from the bulletin board content database (DB) 605. The bulletin board content registration processor 604 has a function to write contribution data sent from the bulletin board client device 303 into the bulletin board content database 605. The bulletin board content database (DB) 605 has a function to store contributed data to be readable and writable.

On the other hand, the bulletin board client device 303 has the following structure. The bulletin board client device 303 has a communication controller 606, a main controller 607, a display 608, and an input unit 609. The communication controller 606, which has a function to receive/send information to/from the communication network 201, is a front end communication processor comprising a protocol stack, a CPU for executing a predetermined communication procedure in compliance with the protocol stack, and the like. The communication controller 606 may be installed in the bulletin board client device by an operating system (OS) such as Windows (Trademark of the Microsoft Corporation).

The main controller 607, which has a function to control the communication, input, and display in the bulletin board client device 303, is web-browser software, for example, such as Internet Explorer (Trademark of the Microsoft Corporation) or Netscape Communicator (Trademark of the Netscape Communications Corporation). The display 608, which is a. device for displaying information to the user, may be a liquid crystal display, a cathode ray tube (CRT) or the like. The input unit 609, which is a device for receiving input from the user, may be, for example, a keyboard, a pointing device or the like.

FIG. 7 is a block diagram showing an exemplary configuration of the information mediation server 202 and the client device 204. The information mediation server 202 has a communication controller 704, a main controller 705 and an information collector 305 connected to the main controller, a searcher 707 and a morpheme analyzer 706 connected to the main controller 705, an analyzer 306 connected to the information collector 305, and a display object database (DE) 708 connected to the main controller 705, the information collector 305 as well as to the analyzer 306.

The communication controller 704, which has a function to receive/send information to/from the communication network 201, is a front end communication processor comprising, for example, a protocol stack, a CPU for executing a predetermined communication procedure in compliance with the protocol stack, and the like. The main controller 705 has a function to control respective components and elements in the information mediation server 202. The morpheme analyzer 706 has a function to analyze a searched sentence (natural sentence), and extract a word that agrees a predetermined condition from this natural sentence. The predetermined condition refers to a designated part of speech, a form of a searched keyword (as appeared or word stem) or the like contained in the result of analysis. The searcher 707 has a function to receive a search formula, and return an information source extracted as a result of search using the search formula. For example, the searcher 707 executes searching of information sources which may include the word extracted by the morpheme analyzer 706, and then returns a URI (Uniform Resource Identifier) which designates the information source thus having been extracted as a result of searching.

The information collector 305 has a function to examine if there is any addition to, correction or updating of a predetermined information source and if so, to acquire the content thereof. By way of example, the information collector 305 may collect information from the information source 106 by patrolling like a search robot, or may acquire information as PUSH type information supplied from the information source 106.

The display object database 708 has a function to store data for displaying each information source in correlation with multifaceted information values. With reference to FIG. 8, there is shown an example of data structures of the display object database 708. FIG. 8 shows an exemplary structure of record for one bulletin board. The display object database 708 stores such record described above for each information source 106 (=bulletin board) which is an object of presentation.

The analyzer 306 has a function to analyze the contents stored in the display object database 708 or collected by the information collector 305, derive multi-faceted information values 104, and to correlate thus derived information values 104 with the information source 106. By way of example, the analyzer 306 may be caused to function only when an overall axis of a space in which respective objects signifying respective information sources 106 are displayed is to be altered, and this frequency of events may be, for example, once in several months or so.

By the way, respective components and elements in the information mediation server 202 are not necessarily required to be installed within a single apparatus, but may be arranged separately in a plurality of apparatuses connected mutually via a communication line or the like.

Figure 9:
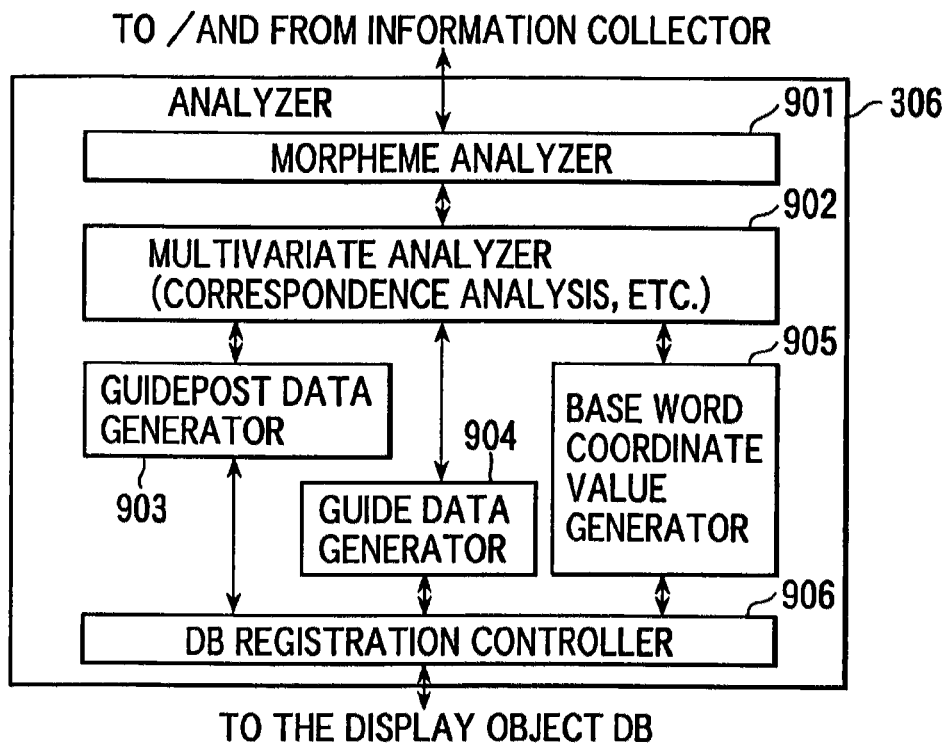
FIG. 9 is a block diagram depicting an exemplary configuration of an analyzer.

In the next, an exemplary configuration of the analyzer 306 will be described. FIG. 9 is a block diagram depicting an exemplary construction of the analyzer 306. In the example depicted in the drawing, the analyzer 306 is comprised of a morpheme analyzer 901, a multivariate analyzer 902 connected thereto, a guidepost data generator 903 connected to the multivariate analyzer 902, a guide data generator 904, a base word coordinate value generator 905, and a database registration controller 906 connected to the above-mentioned respective generators.

The morpheme analyzer 901 has a function to analyze the natural sentence or the like collected by the information collector 305, and extract words from the natural sentence that match a predetermined condition. The predetermined condition refers to a designated word or part of speech contained in a result of analysis, a type of searched keyword (as appeared, or word stem), and the like. The multivariate analyzer 902 analyzes information regarding respective bulletin boards (the data stored in the display object database (DB) 708 and/or collected by the information collector 305) by a statistical method, and obtains a correlation or the like between the plurality of the bulletin boards. As one of the methods for implementing the multivariate analyzer 902, the approach disclosed in the 'Method and Device for Analyzing Thought System' in Japan Patent Publication No. 2001-155063 may be considered.

The guidepost data generator 903 has a function to generate a data for an object representing an information value of each bulletin board on the basis of a result of analysis by the multivariate analyzer 902. The guide data generator 904 generates a data for displaying a "tube", which will be described later, on the basis of the result of analysis by the multivariate analyzer 902. The guide data refers to a data for visually displaying regularity in the arrangement of information sources to the user. The base word coordinate value generator 905 has a function to generate positional coordinates of a respective "base word" that functions as an index which constitutes the information value space. The database (DB) registration controller 906 functions as a database management system (DBMS) to write and read the data generated by respective generator parts to and from the display object database 708.

By way of example, respective components and parts 901-906 in the analyzer 306 described above are not necessarily required to be installed within a single apparatus, but may be distributed separately in a plurality of apparatuses (including the client device 204) which are mutually connected via a communication line or the like.

Exemplary Operation of the Information Mediation Server

The information mediation server 202 generates information which helps to link between the user and a specific information source (in this embodiment, a specific bulletin board) in response to a request from the client device 204, on the basis of the data stored in the display object database 708, and transmits this information to the client device 204. This information which links between the user and the specific information source is provided to the user as a user interface display in the client device 204. Further, the information mediation server 202 executes a periodical monitoring process to be described below.

Periodical Monitoring Process

Figure 10:
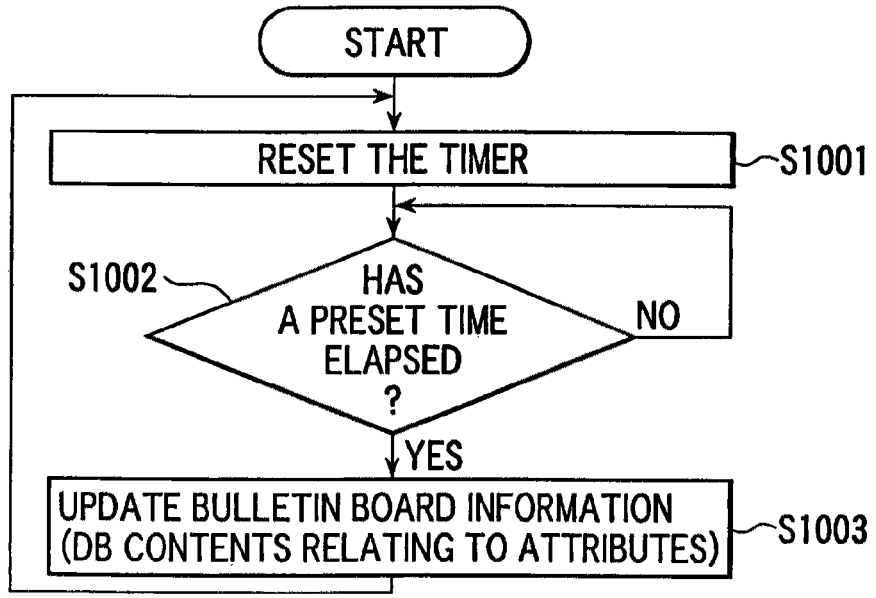
FIG. 10 is a flowchart indicating algorithm for updating attributes (such as activity) of each community.
Figure 11:
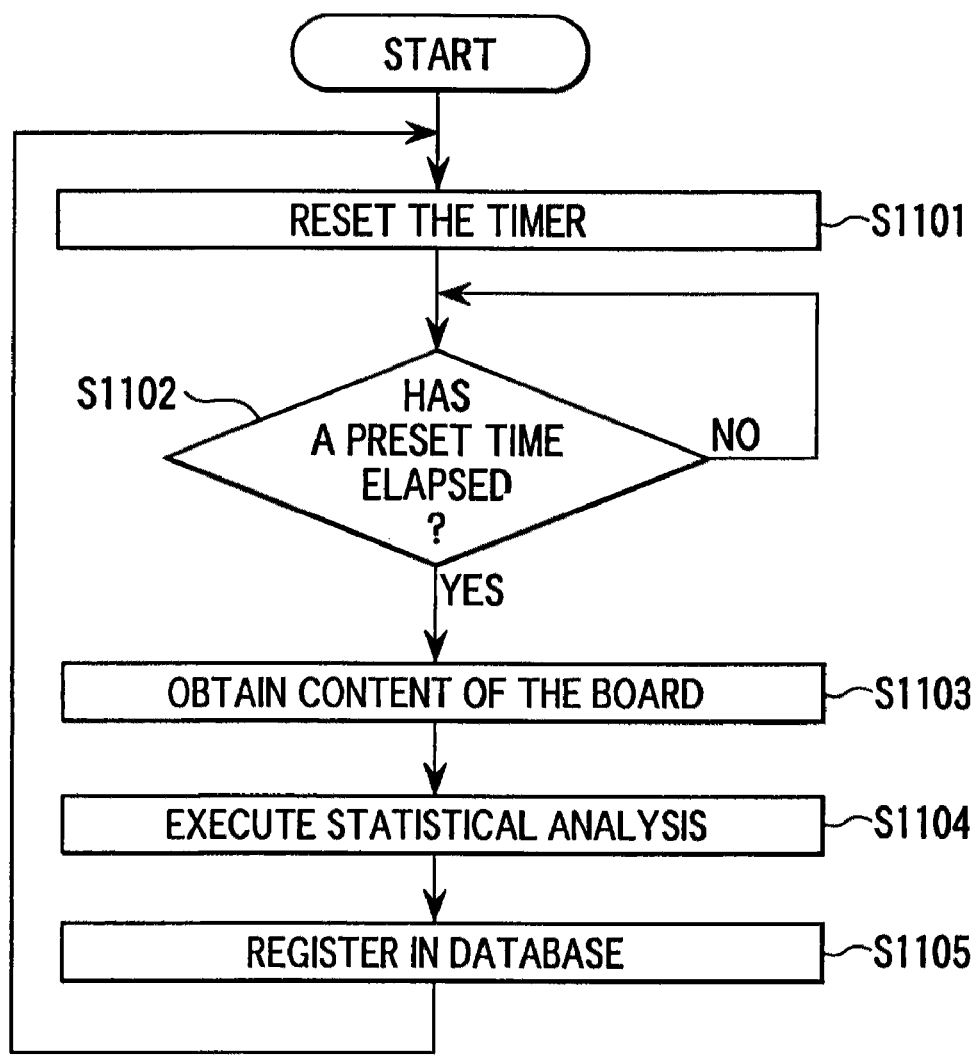
FIG. 11 is a flowchart indicating update algorithm associated with the analysis of the information value space.

Generally, in the case where each information source 104 has a property to grow and develop in scale with an increasing number of participants, its information value and its information value space will change with elapse of time. According to the present embodiment, by periodically obtaining the contents reflecting this change from the information sources, new status of the information sources, their information values and information value space can be presented to the user. Algorithm of this periodical monitoring process is indicated in FIGS. 10 and 11. FIG. 10 depicts algorithm for updating attributes (such as activity) of respective information sources, and FIG. 11 depicts algorithm for updating the information value space as a result of the analysis. As for the former, because a load of its processing is lighter than that of the latter, a high frequency updating is carried out so as to be able constantly to provide most update information and enhance advantageousness to the user.

By referring to FIG. 10, the information mediation server 202 resets a timer (not shown) in step 1001. Then, it is checked in step 1002 whether or not a preset period of time has elapsed after resetting the timer. If the preset time has not elapsed, the process returns to step 1002, and if elapsed, the information collector 305 is activated to execute patrolling through respective bulletin boards and collect updated pieces of information in step 1003. Then, the process returns to step 1001 to repeat the same steps. Thereby, it becomes possible to periodically collect and update the information of the bulletin board which is subject to change, and provide information for linking between the user and the information sources on the basis of the updated information.

FIG. 11 depicts a flow of update processing of the information value space in accordance with the analysis in the information mediation server 202. At first, the information mediation server 202 resets the timer (not shown) in step 1101. Then, in step 1102, it is checked whether or not the preset time has elapsed after resetting the timer. If the preset time has not elapsed, the process returns to step 1102, and if elapsed, the information collector part 305 is activated to collect updated information from respective information sources in step 1103. On the basis of the updated information collected and the information already stored, the analyzer part 306 analyzes a correlation and the like between the respective information sources (the bulletin boards in this embodiment) in step 1104. Then, coordinate values in the information value space, guidepost data, guide data, base word coordinate values and the like of an object representing an information source (hereinafter, referred to as the "information source display object"), which were generated on the basis of a result of the analysis, are written in the display object database 708 in step 1105. Subsequently, the process returns to step 1101 to repeat the same processing.

An Exemplary Method of Displaying the Information Value Space in the Client Device 204

In order to derive an information value of an information source 106 (the bulletin board in the embodiment) and a correlation between respective information sources, an information value space is considered which is a system of information values formed by all of the plurality of information sources of interest. For derivation of the information value space, use of primary information contained in the information source is considered, and in the case where the bulletin board is handled as the information source 106, contents of opinions submitted to the bulletin board of interest may be used as elements of the analysis, and the method of analysis disclosed in the "Method and Device for Analyzing Thought System" in Japan Patent Publication No. 2001-155063 may be used.

Further, by the method disclosed in the aforementioned patent publication, a respective information source display object (e.g., one object presents one bulletin board) can be laid out in the information value space at a specific location corresponding to its information value in consideration of the correlation between those of the objects. Among the plurality of the information source display objects thus laid out, such objects having similar or nearly equal information values are arranged in juxtapositions. According to this display (presentation) method, by browsing at least one information source (bulletin board), the user is allowed to infer an information value of another information source corresponding to another information source display object which is juxtaposed to the display object of the at least one information source. Further, according to this method of display, by displaying a typical guidepost data representing information values corresponding to information source display objects disposed in the neighborhood, it is enabled for the user readily to know an information value of an information source signified by an information source display object existing in the vicinity of the guidepost data. Thereby, it becomes possible to find an appropriate information source containing the information value the user is looking for, and assist a heuristic search associated therewith. Still further, by displaying the guide data for visually indicating some regularity in the layout of the information source display objects to the user in combination with the information source display object, the user can intuitively recognize this regularity.

As described hereinabove, the information mediation server 202 obtains the information capable of linking between the user and the information source, and provides this information to the client device 204. The client device 204 processes the provided information by the main controller 702, and displays on the display 307 recognizable by the user. In the following, a method of displaying the information for linking the user with the information source, and a graphical user interface realized by this method according to an embodiment of the present invention will be described.

Figure 12:
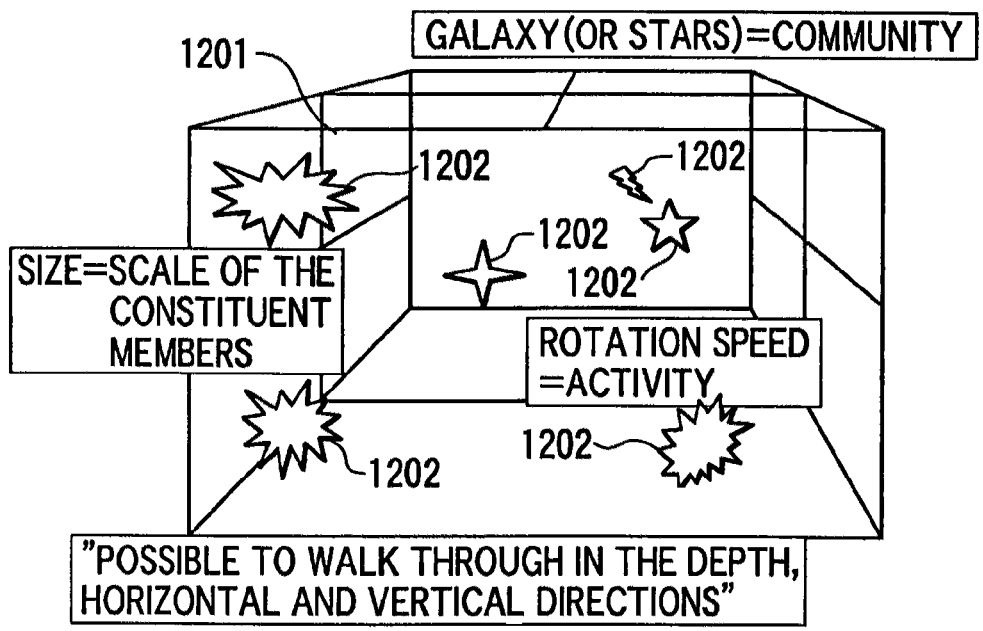
FIG. 12 is a diagram depicting an example of information value space.

FIG. 12 is a diagram illustrating an exemplary information value space to be displayed according to the embodiment of the present invention. In this exemplary embodiment, the information value space is shown simulating a three-dimensional space (cosmic space). A plurality of information sources (bulletin boards in this embodiment) exist inside the three-dimensional space 1201, and respective information sources are indicated by information source display objects 1202 simulating galaxies or stars. Respective information source display objects 1202 have respective attributes represented by such as shapes, sizes, rotation speeds, colors and the like. These attributes express characteristics of respective information sources corresponding to respective information source display objects 1202. Here, it is preferable to use a method of expression which is intuitively understandable to the user, for example, such that its shape expresses freshness of the information source, its size expresses the number of constituent members of the information source, its rotation speed expresses activity (the number of opinions contributed within a predetermined period of time, or the like) of the information source, and so on. Further, in the three-dimensional space 1201, the viewing point of the user can be shifted freely, thereby allowing the user to observe the information source display objects 1202 distributed in the three dimensional space 1201 from any position and direction the user desires. For example, by allowing to move freely in any directions or to change the viewing direction freely, the information source display objects 1202 distributed within this space can be observed freely.

Figure 13:
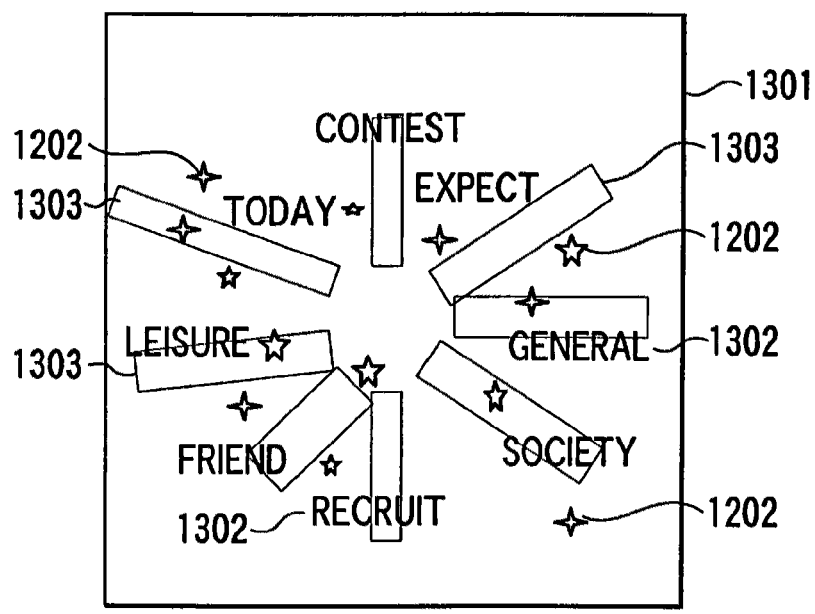
FIG. 13 is a diagram depicting an example of presentation of the information value space including guides.

FIG. 13 depicts an exemplary information value space containing guide data according to the invention. In the drawing, within an information value space 1301, there are disposed information source display objects 1202, tubes 1303 which are guide data, and base word labels 1302 which express guidepost data.

For example, according to the method of analysis disclosed in the "Method and Device for Analyzing Thought System", Japan Patent Publication No. 2001-155063 described above, it is possible to arrange information source display objects having the same tendency in their information values to align on one linear line. In this case, by providing a tube 1303 as a guide data typifying this linear line, a method of displaying a direction of trend of respective information source display objects 1202 distributed within the information value space 1301 can be provided. For example, by choosing a certain information source display object 1202 existing in the periphery of a same tube 1303, the user is allowed readily to discover plural other related information sources having a common information value. Further, by selecting at least one information source display object 1202 in a region of the space where the user can discover many related guidepost data 1302 corresponding to the user's own sense of value, the user is allowed readily to discover other related information source having the information value corresponding to the user's own sense of value. Still further, by use of the non-language attributes such as the color, shape, texture, rotation speed and the like of a respective information source display object as described above, a state (for example, activity, freshness and the like) of the information source corresponding thereto is visually presented to the user, thereby allowing for the user to recognize the state of the information source intuitively.

Figure 14:
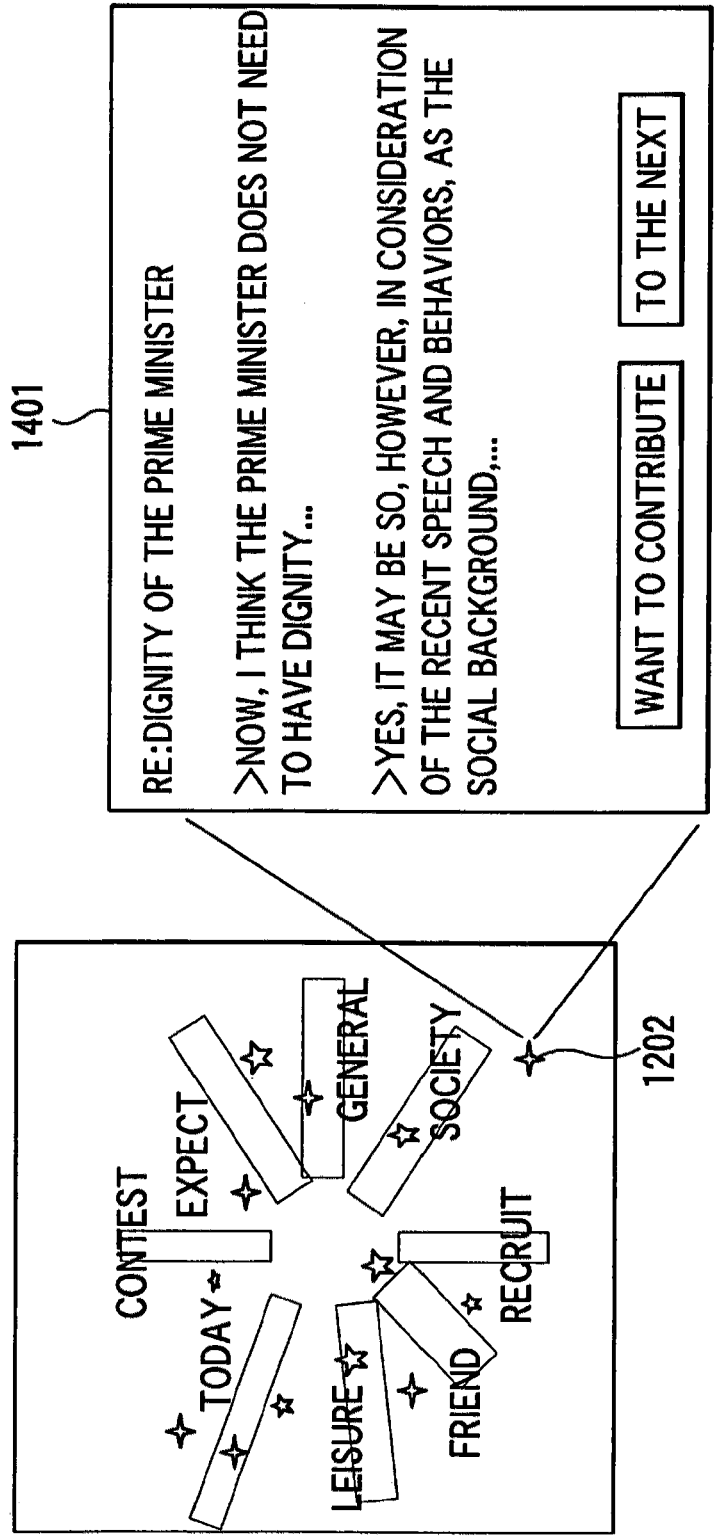
FIG. 14 is a diagram depicting an example of display screen in which an object is activated by a predetermined operation of the user.

FIG. 14 shows an example of display screens in the case 20 where a certain information source display object 1202 in FIG. 13 is activated by operation of the user (for example, clicking with a pointing device). The same drawing illustrates a state of the display screen where, by clicking of the information source display object 1202, a window 1401 for displaying a bulletin board is generated, and the content of the bulletin board is displayed on the display 307 of the client device 204. Namely, by providing identification information (for example, URI (Uniform Resource Identifier)) for identifying a respective information source corresponding to a respective information source display object 1202 displayed, and when the user selects an information source display object to be processed by clicking the mouse or the like, the user can jump to the information source corresponding thereto and have the contents thereof displayed on the display 307 of the client device 204. Thereby, the user can hit more easily and conveniently an appropriate information source, browses the contents thereof, and participates therein.

An Exemplary Configuration of the Graphical User Interface

Figure 15:
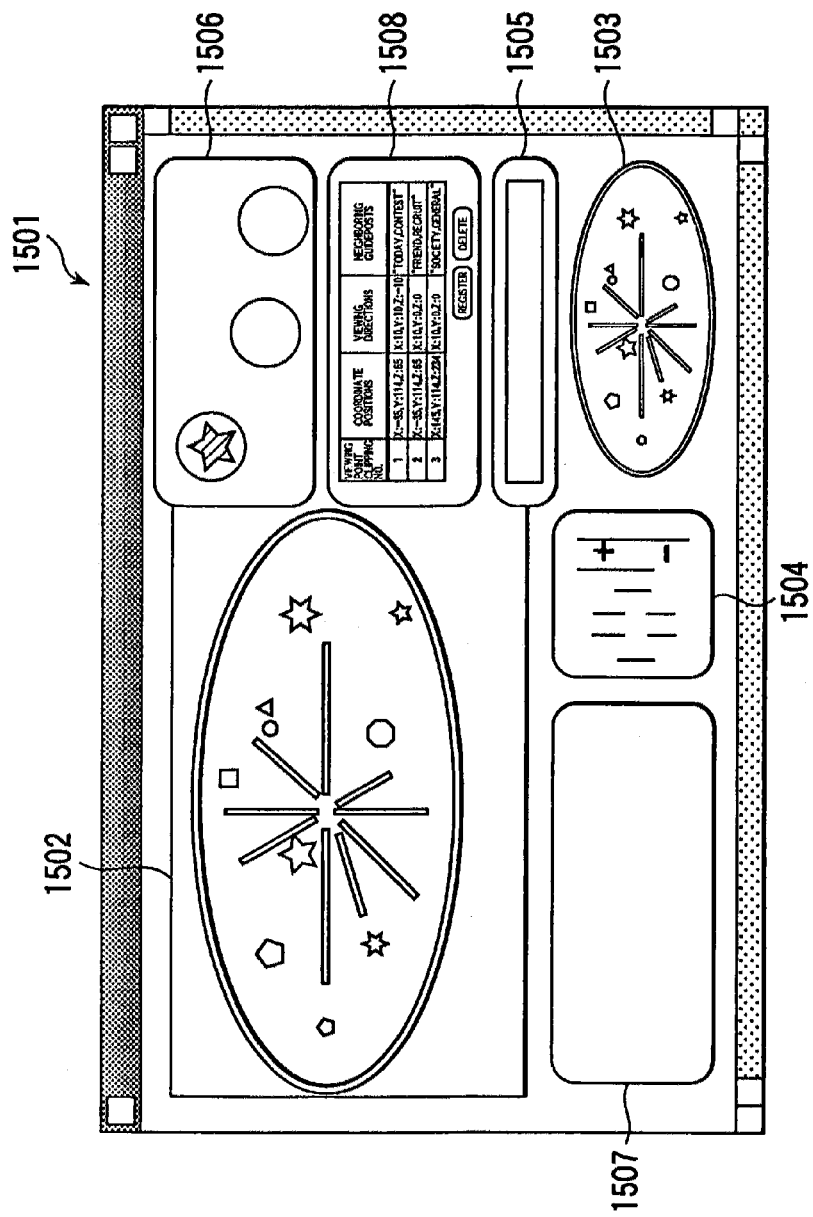
FIG. 15 is a diagram depicting an exemplary configuration of the graphical user interface.
Figure 16:
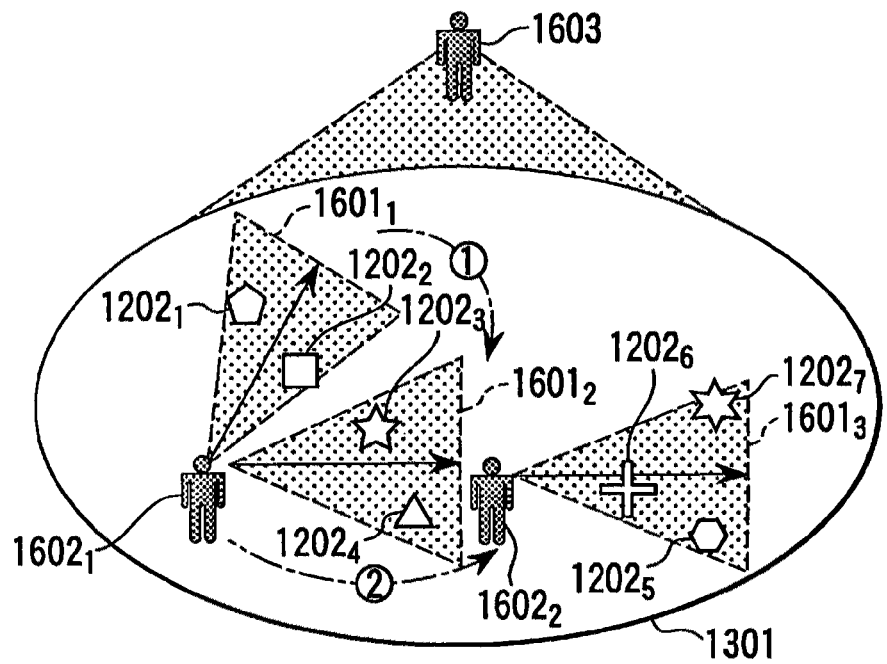
FIG. 16 is a diagram depicting information value space display regions and an overall display region.
Figure 17:
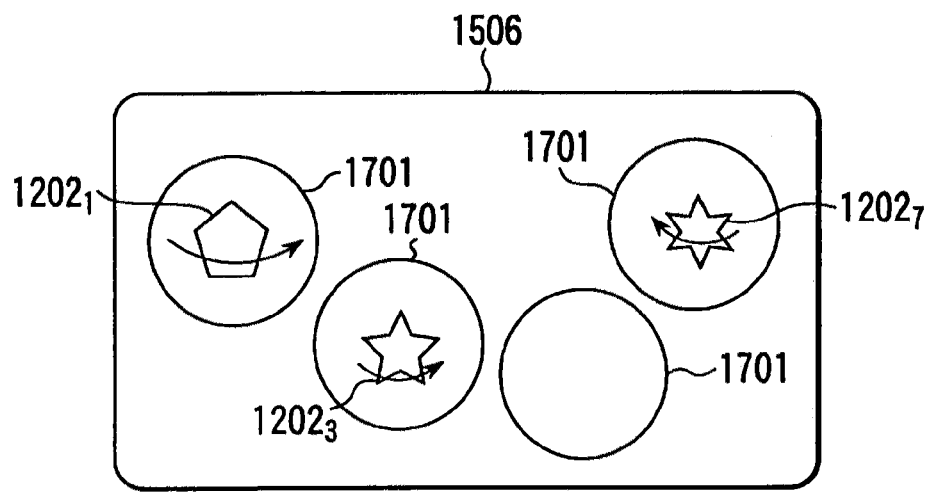
FIG. 17 is a diagram depicting an exemplary configuration of a fixed point observation region.
Figure 18:
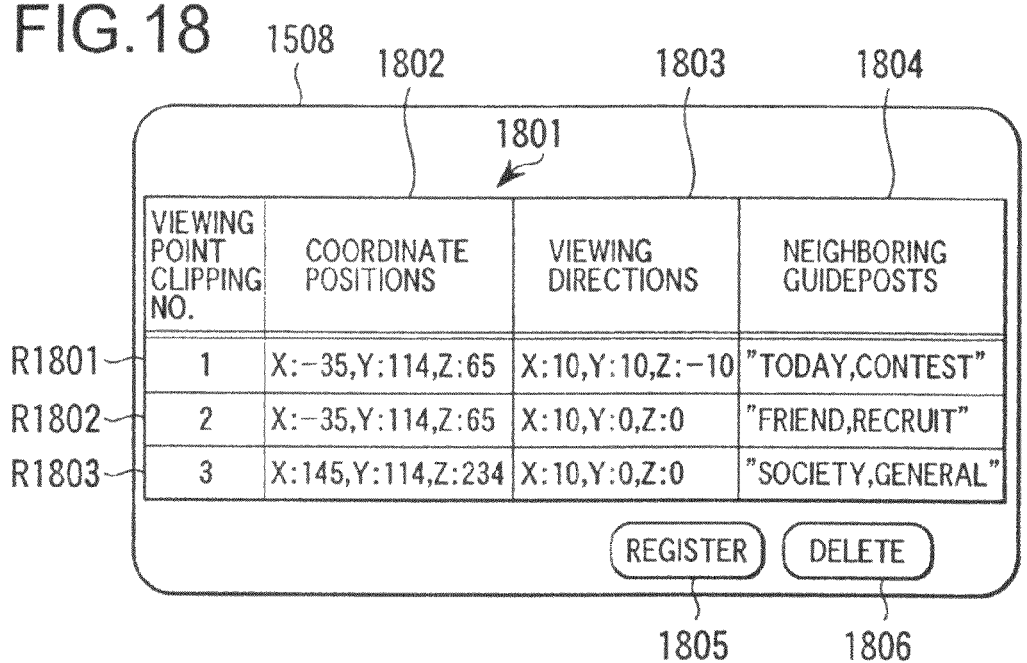
FIG. 18 is a diagram depicting an exemplary data structure of a viewing point clipping region.

By referring to FIGS. 15-18, exemplary configurations of a graphical user interface (hereinafter, referred to as GUI) to be provided via the display 307 of the client device 204 will be described. FIG. 15 is a diagram showing an exemplary arrangement of GUI for displaying the information, which links between the user and the information source and is supplied from the information mediation server 202, by the client device 204. FIG. 16 is a conceptual diagram illustrating a plurality of information value space display regions 1502 and an entire display region 1503. FIG. 17 shows an example of an information source fixed-point observation region, and FIG. 18 is a table showing an exemplary structure of a viewing point clipping region.

In the example shown in FIG. 15, a GUI for displaying information for linking between the user and the information source is generated in a window 1501. This GUI has the information value space display region 1502, the entire display region 1503, a field of vision operating region 1504, a search word input region 1505, an information source fixed-point observation region 1506, an attribute display region 1507, and a viewing point clipping region 1508.

The information value space display region 1502 has a function to display an information value space in a field of vision designated by the user. The information value space display region 1502 displays the information source display objects 1202, the guidepost data 1302, and the guide data 1303 that are contained in the field of vision designated by the user, in accordance with their respective positional relations, and displays a three-dimensional virtual space as shown, for example, in FIGS. 12, 13. By way of example, the guidepost data 1302 and the guide data 1303 are not always required to be displayed, and thus the user may choose whether to display or not.

As for the information source display object 1202, it has an appearance that represents attributes and/or characteristics of the information source corresponding thereto. For example, in accordance with freshness of the information source, the shape of the information source display object 1202 may be formed into a triangular pyramid, a cube, a polyhedron or the like. Further, in accordance with activity of the information source, the rotation of the information source display object 1202 may be varied, or stopped. Still further, as another example, the information source display object 1202 representing the information source and having been already browsed by the user may be painted in a predetermined color (for example, in red). Furthermore, as still another example, the information source display object 1202 representing the information source hit in the search from the search input region 1505 may be enhanced of its brightness than that of the other information source display objects 1202. By way of example, the appearance of the information source display object 1202 indicative of the attributes and/or characteristics of its information source is not limited to those described above, and any other appearance elements or forms that can be expressed in the. client device 204 may be used. Various other elements of appearance or the like thereof may be considered for indicating the attributes and/or characteristics of the information source, in addition to the color, brightness, and brilliance of the information source display objects 1202. For example, the attributes and characteristics of the information sources may be represented by a pattern, texture to be pasted on its information source display object or by a blinking speed thereof, a rhythm of its pulsation, a direction of rotation thereof, and the like.

The entire display region 1503 has a function to display a whole portion of the information value space, and is a region for indicating a relation between a region represented by each information value space display region 1502 and the entire information value space. By the display of the entire display region 1503, the user can know at which position in the information value space the user is now standing, and looking at which direction. The field of vision operating region 1504 has a tool whereby the field of vision within the information value space can be altered arbitrarily. For example, the field of vision operating region 1504 has a crisscross switch for rotating a viewing direction of the field of vision in the vertical and horizontal directions, a plus and a minus keys for moving a viewing point of the field of vision in depth directions (perpendicular directions with respect to the plane of the drawing). By operating these keys, the user can alter the field of vision in the information value space. and in accompaniment with these operation, contents to be displayed in the information value space display region 1502 are changed in linkage therewith.

By referring to FIGS. 15 and 16, the shift in the field of vision, and the relation between the information value space display region 1502 and the entire display region 1503 will be described. First of all, in the information value space 1301, the user views through the information value space 1301 from a viewing position $1602_1$ so as to have a field of vision $1601_1$. At this time, in the field of vision 1601 there are included two information source display objects $1202_1$ and $1202_2$. Thereby, in the information value space display region 1502 there are displayed these two information source display objects $1202_1$ and $1202_2$.

Then, the user performs the rotation operation using the field of vision operating region 1504 so as to shift to have a field of vision 16012. In the field of vision $1601_2$ there are included two different information source display objects $1202_3$ and $1202_4$. Thereby, contents to be displayed in the information value space region 1502 are altered in accordance with a change in the field of vision. Consequently, the two different information source display objects $1202_3$ and $1202_4$ are newly displayed in the information value space display region 1502, and the other two information source display objects $1202_1$ and $1202_2$ which are now outside the field of vision $1601_2$ are not displayed in the information value space display region 1502. Then, using the field of vision operating region 1504, the user moves the viewing point from the viewing position $1602_1$ to a viewing position $1602_2$. Thereby, the field of vision changes from the field of vision $1601_2$ to a field of vision $1601_3$, and in a new information value space display region 1502 there are displayed three different information source display objects $1202_5$, $1202_6$ and $1202_7$.

By shifting and changing the fields of vision appropriately as described above, the user is allowed to view through any and every region in the information value space. Further, in accompaniment with the virtual shifting of the viewing point of the user, a method of presentation of the information display objects and/or the guidepost objects may be changed. For example, when viewing from a remote distance, a small number of guideposts are displayed in perspective, and when viewing from a nearer point, a greater number of guideposts are displayed more in detail. By controlling a quantity of information to be displayed as described above, the quantity of information for the user to overview at a glance can be accommodated within an appropriate extent, thereby making it easier to observe and recognize the contents in the information value space.

On the other hand, the entire display region 1503 allows displaying the information value space 1301 as viewed from the viewing position 1603 at which the whole portion of the information value space 1301 can be looked over. Further, a current position of the viewing point of the user may be displayed within the information value space 1301 as well. Thereby, the user can recognize immediately at which position in the information value space 1301 the user is now standing and provide a yardstick to estimate at which direction the user should move in the next step.

Now, the search word inputting region 1505 will be described. The search word inputting region 1505 is a region for receiving a search word from the user. The search word accepted is passed to the searcher 707 in the information mediation server 202. The searcher 707 identifies an information source containing the search word, and notifies the client device 204 of this identification. The client device 204 displays according to a predetermined method to the user the information source display object 1202 corresponding to the information source having been notified. As the predetermined method, it may be considered to change the color of the object, to blink or the like.

A fixed-point observation region 1506 will be described. The fixed-point observation region 1506 has a function to record an information source display object 1202 the user wants continuously to observe, and display an update state of the information source display object 1202 recorded. FIG. 17 shows an exemplary arrangement in the fixed-point observation region 1506. The fixed-point observation region 1506 has one or more recording areas 1701. By dragging an information source display object 1202 with a pointing device to either one of the recording areas 1701 a copy of the information source display object 1202 or of an information source display object having a display mode accompanying further detailed information is generated in the fixed-point observation region 1506 and stored. The information source display object 1202 to be displayed in this fixed-point observation region 1506 is caused to correspond to the most update information from the information mediation server 202, thereby indicating a current state responsive to a change in the information source corresponding thereto. Thereby, without a need of shifting in the information value space using the field of vision operating region 1504, the user is allowed at any time to observe the information source display objects 1202 or access the information source thereby merely by referring to the fixed-point observation region 1506. Further, by observing the display mode accompanying more detailed information, the user can learn the detailed information. Here, as an example of the display mode accompanying the more detailed information, it may include such an instance in which its rotation speed, for example, is converted into more minute steps than that of the information source display object 1202, or the like.

In the next, the attribute display region 1507 will be described. The attribute display region 1507 has a function to display detailed information regarding an information source display object 1202 designated by the user. As an example of the detailed information, there may be included its title, site name, top category, the last updated date, the total number of opinions and so on. The designation of the information source display object 1202 by the user is performed by a pointer over operation, clicking or the like.

A viewing point clipping region 1508 will now be described. The viewing point clipping region 1508 has a function to record the field of vision (including a viewing position and a direction of the field of vision) designated by the user, and to display the contents of the information value space contained in the recorded field of vision on the information value space display region 1502 in response to a request from the user. FIG. 18 is a table depicting an exemplary structure of the viewing point clipping region 1508, In this exemplary construction, the viewing point clipping region 1508 has a viewing point clipping display region 1801, a register button 1805 and a delete button 1806. The viewing point clipping display region 1801 has a function to display one record per viewing point information recorded. Each record has a coordinate position 1802 indicating its viewing position, a viewing direction 1803 indicating the direction of its field of view, information 1804 relating to voting data in the neighborhood of the fixed point, and the like. In the instance shown in FIG. 18, records R1801, R1802 and R1803 corresponding to the three different fields of vision 1601k. 16012 and 16013 shown in FIG. 16 are recorded, respectively. By designating any of these records by clicking or pressing the enter key, the user is enabled to have the field of vision corresponding to this designated record displayed in the information value space display region 1502.

Further, activating the register button 1805 by clicking or pressing the enter key, the user is allowed to record new viewing point information. When the new viewing point information is recorded, a new record is displayed on the viewing point clipping display region 1801. Further, when the user activates the delete button 1806 by clicking or pressing the enter key after designating any one of the records of the fixed point information, its record on the fixed point information can be deleted.

Modifications

The present invention may be applied also to a system which exhibits and/or reproduces painting, pictures, images, motion pictures, and audio files as information sources to the user. Further, if information which visually represents contents of the paintings, pictures, images, motion pictures or the like is used as the information source display object of the embodiment, because each visual information source display object can function as the guidepost data by itself, it can assist a heuristic search by the user without a need of provision of the guidepost data.

Others

Further, the information sources that can be handled by the system according to present the invention are not limited to the information sites such as electronic bulletin board system or the like, and any other information sources may be handled likewise. Still further, as the information that can be analyzed by the information mediation server 202, there is the "natural sentence" submitted as an opinion to the bulletin board. However, the present invention can be applied also to such a community where, instead of the natural sentence or in combination with the natural sentence, non-language elements such as a picture image, painting, movie (a cut or scene thereof addressed to as elements of analysis), music (artists or song phrases addressed to as elements of analysis) are used as a means of communication, or even to the non-language element itself.

Examples of modifications of the present invention that uses such non-language elements will be described.

(1) Virtual Museum Site

Figure 19:
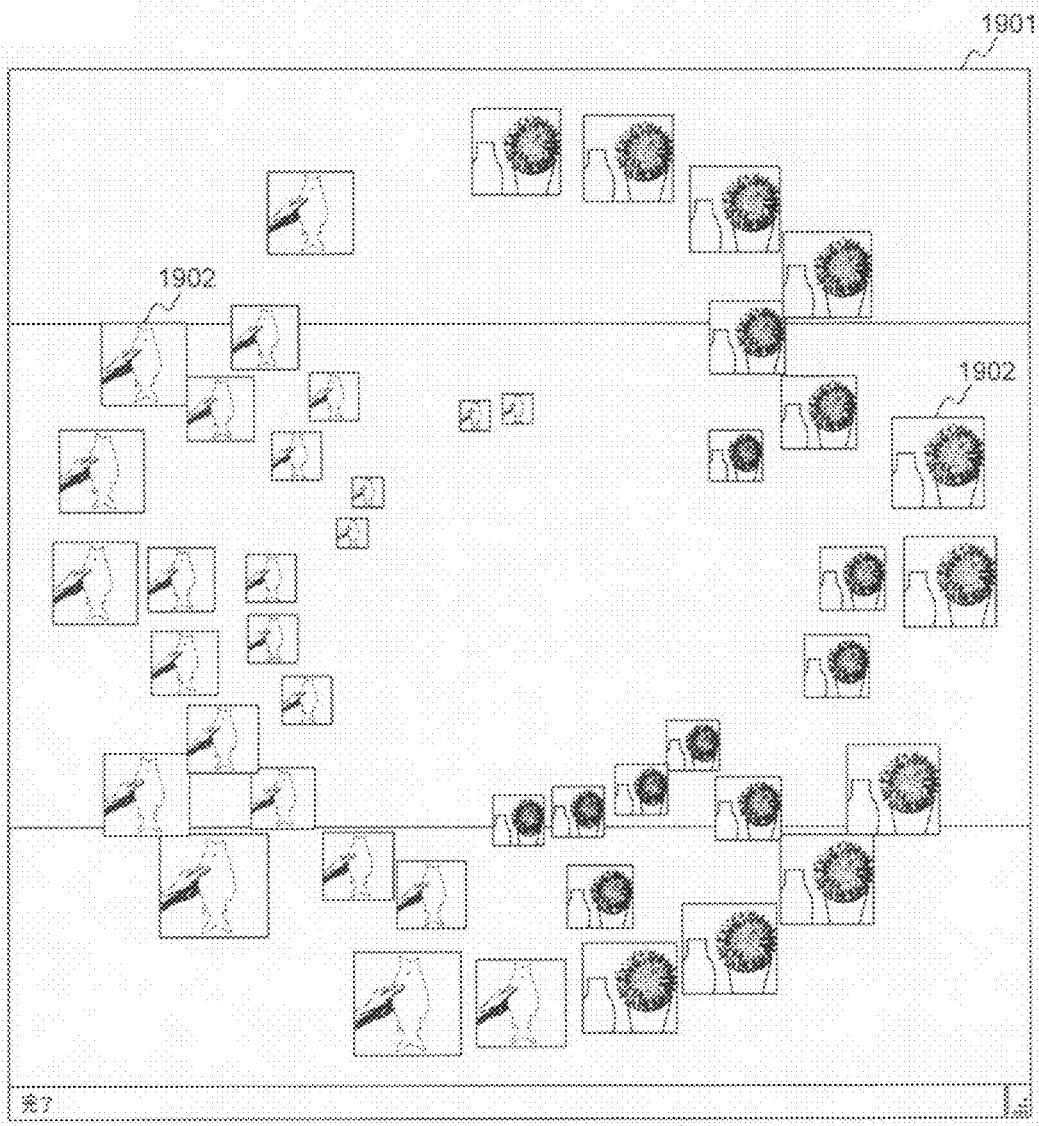
FIG. 19 is a diagram depicting another exemplary configuration of the graphical user interface.

FIG. 19 shows an example of displays of the GUI (the information value space display region) according to the invention wherein the information source is a virtual museum site. In the drawing, in the information value space display region 1901, there are arranged and displayed thumbnails 1902 of picture images as the information source display objects. The thumbnails 1902 are thumbnails of paintings collected by the virtual museum site. The user can search paintings heuristically on the basis of his/her preference and liking while viewing through the thumbnails. Upon discovery of a picture image of his/her liking, and when the user clicks the thumbnail 1902 of that picture image or the like, it jumps to the virtual museum site, enabling the user to observe the collection of paintings and the like at the virtual museum site.

(2) Pet Photographs

Figure 20:
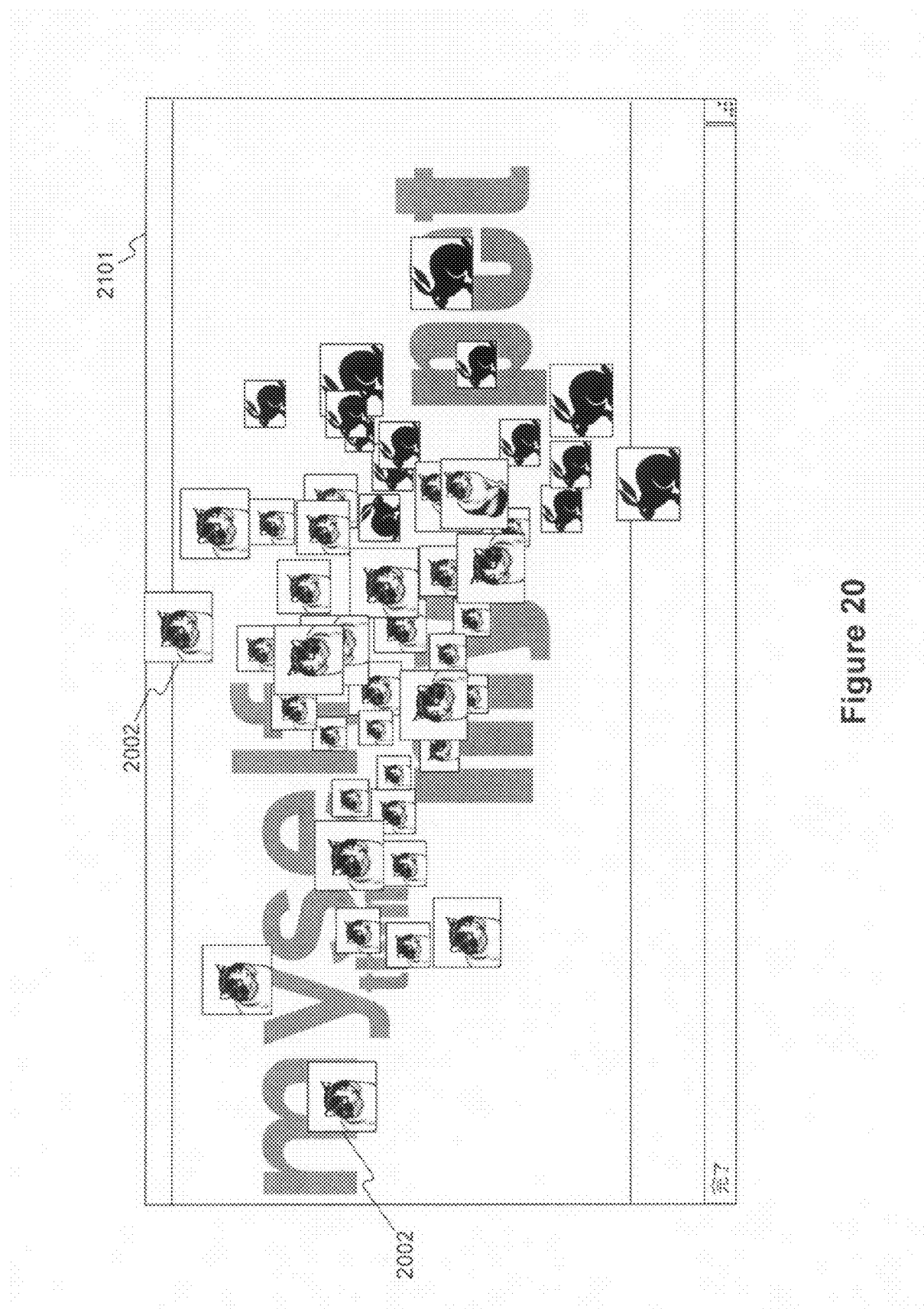
FIG. 20 is a diagram depicting still another exemplary configuration of the graphical user interface.

FIG. 20 is an example of displays according to the GUI of the invention where thumbnails of picture images are used as the information source display objects. Here, the picture images are photographs of pet animals selected by a participant. In this drawing, in the information value space display region 2001, there are disposed thumbnails 2002 of the picture images as the information source display objects. These thumbnails are photographs of pets selected by the participant. Which photograph of what kind of pets to choose is considered to reflect an individual propensity and/or a lifestyle of a participant. Thus, by visiting the site and viewing through the thumbnails 2002 disposed in the information value space display region 2001, the user may discover not only a pet that matches or nearly matches his/her own sense of value, but also other participants who have the same or similar propensity and/or lifestyle.

(3) Music Sites

Figure 21:
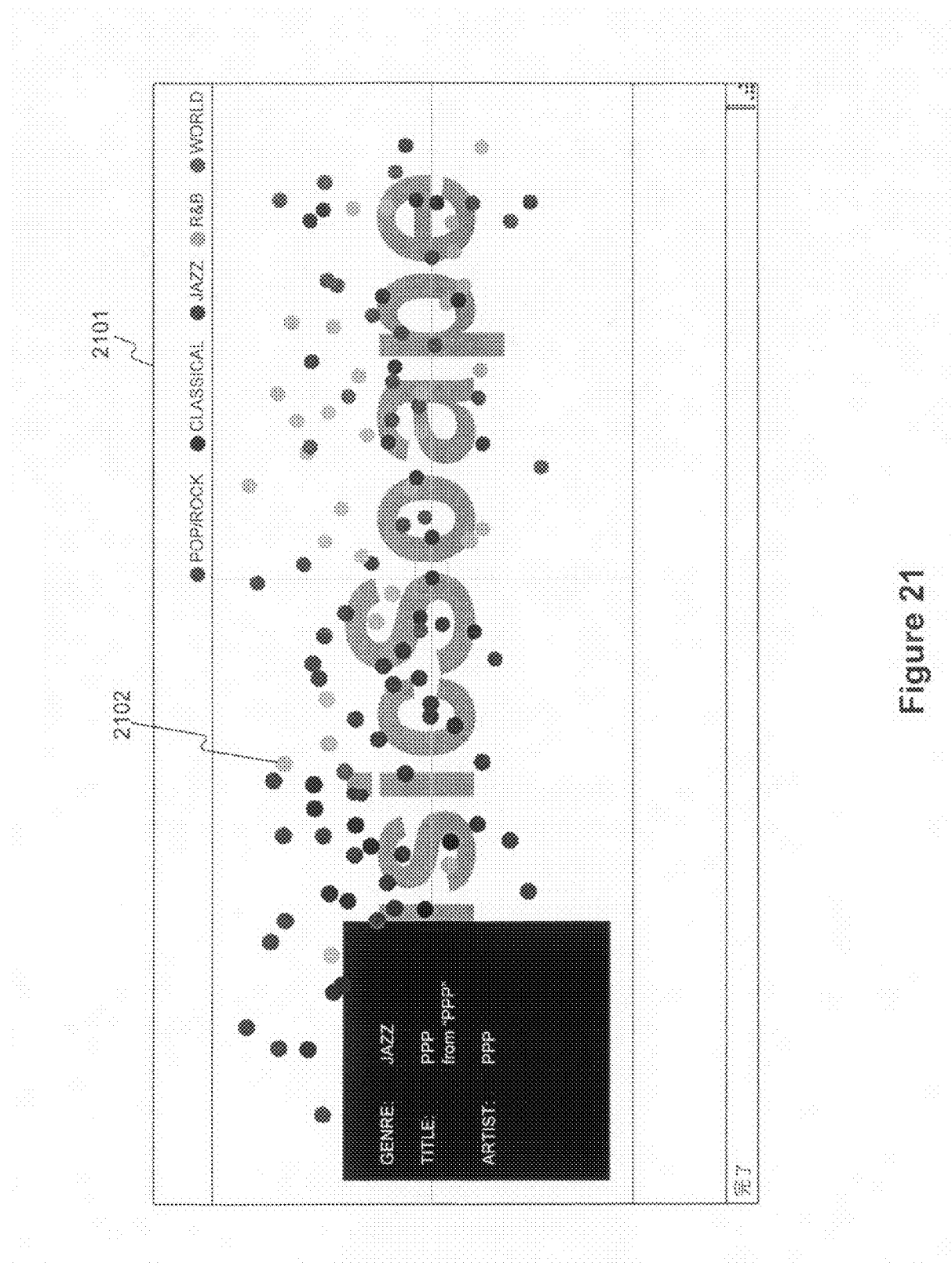
FIG. 21 is a diagram depicting still more another exemplary configuration of the graphical user interface.

FIG. 21 is an example of displays according to the GUI of the present invention, where an object for reproducing a whole of a music composition or a part thereof (e.g. a starting part) is used as the information source display object, and wherein all of the information source display objects is represented by a small spherical object. In FIG. 21, in its information value space display region 2101, there are distributed small spherical objects 2102 as the information source display objects. This spherical object, when activated by the user, enables to reproduce the whole portions or a part of a music composition. While searching through the information value space by reproducing the whole portions or parts of the music compositions, the user is enabled to search a music composition the user likes.

As described hereinabove, the present invention can be applied also to such instances where the non-language elements are used.

The configurations of the user interface according to the embodiment of the present invention described hereinabove are only exemplary, and the invention is not limited thereto, and obviously many changes, variations and combination are possible herein. It is therefore to be understood that any modifications will be practiced otherwise than as specifically described herein without departing from the scope of the present invention.

The invention claimed is:

1. An apparatus comprising:
a processor; and
a memory, wherein the processor and the memory are configured to:
collect information from a plurality of information sources, the information sources being connected over a communication network,
analyze the collected information using a statistical method,
derive, using the analysis and information values of the collected information, an information value space,
generate data for displaying a commonality between the information sources, represented by respective display objects, in the information value space, the commonality being represented by a location of one display object in the information value space relative to a location of another display object in the information value space, and the data including a display object for each information source,
analyze natural sentences from the collected information and extract words from the natural sentences that match a predetermined condition,
analyze the extracted words to determine an amount of correlation between the information sources,
generate a base word and a coordinate value for the base word that represent the correlation, and
transmit the data, the information value space, and the base word to a client device for display.

2. An apparatus according to claim 1, wherein the processor and the memory are further configured to generate a coordinate system for locating the display objects in the information value space.

3. An apparatus according to claim 1, wherein the client device displays the information value space and the display objects.

4. An apparatus according to claim 1, wherein the processor and the memory are further configured to determine an appearance of the display objects based on an attribute or characteristic of each corresponding information sources.

5. An apparatus according to claim 1, wherein the processor and the memory are further configured to locate the display objects in the information value space based on positional coordinates of a base word.

6. An apparatus according to claim 1, wherein the display objects comprise thumbnails of picture images provided by the information sources.

7. An apparatus according to claim 1, wherein the display objects reproduce at least a portion of a music composition.

8. An apparatus according to claim 1, wherein the display objects are rotated to indicate an activity of each corresponding information source.

9. An apparatus according to claim 1, wherein a form of the display objects represents a freshness of each corresponding information source.

10. A method comprising:
collecting information from a plurality of information sources, the information sources being connected over a communication network,
analyzing the collected information using a statistical method,
deriving, using the analysis and information values of the collected information, an information value space,
generating data for displaying a commonality between the information sources, represented by respective display objects, in the information value space, the commonality being represented by a location of one display object in the information value space relative to allocation of another display object in the information value space, and the data including a display object for each information source, analyzing natural sentences from the collected information and extract words from the natural sentences that match a predetermined condition, analyzing the extracted words to determine an amount of correlation between the information sources, generating a base word and a coordinate value for the base word that represent the correlation, and transmitting the data, the information value space, and the base word to a client device for display.

11. A method according to claim 10, further comprising generating a coordinate system for locating the display objects in the information value space.

12. A method according to claim 10, wherein the client device displays the information value space and the display objects.

13. A method according to claim 10, further comprising determining an appearance of the display objects based on an attribute or characteristic of each corresponding information sources.

14. A method according to claim 10, further comprising locating the display objects in the information value space based on positional coordinates of a base word.

15. A method according to claim 10, wherein the display objects comprise thumbnails of picture images provided by the information sources.

16. A method according to claim 10, wherein the display objects reproduce at least a portion of a music composition.

17. A method according to claim 10, wherein the display objects are rotated to indicate an activity of each corresponding information source.

18. A method according to claim 10, wherein a form of the display objects represents a freshness of each corresponding information source.

* * * * *